United States Patent
Akhter et al.

(10) Patent No.: US 7,944,854 B2
(45) Date of Patent: May 17, 2011

(54) IP SECURITY WITHIN MULTI-TOPOLOGY ROUTING

(75) Inventors: Aamer Akhter, Cary, NC (US);
Manikchand Roopchand Bafna, Bangalore (IN); Rajiv Asati, Morrisville, NC (US); Mohamed Khalid, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 11/969,457

(22) Filed: Jan. 4, 2008

(65) Prior Publication Data
US 2009/0175194 A1   Jul. 9, 2009

(51) Int. Cl.
*H04L 12/28* (2006.01)

(52) U.S. Cl. ......... 370/254; 370/352; 370/392; 709/249

(58) Field of Classification Search .......... 370/392, 370/255, 352; 713/201
See application file for complete search history.

(56) References Cited

U.S. PATENT DOCUMENTS

| | | | |
|---|---|---|---|
| 7,689,722 B1* | 3/2010 | Timms et al. | 709/249 |
| 2004/0117657 A1* | 6/2004 | Gabor et al. | 713/201 |
| 2007/0030852 A1* | 2/2007 | Szczesniak et al. | 370/392 |
| 2008/0178289 A1* | 7/2008 | Gearhart et al. | 726/22 |
| 2008/0304472 A1* | 12/2008 | Gourlay et al. | 370/352 |

OTHER PUBLICATIONS

Mirtorabi, et al., "Multi-topology routing in OSPFv3 (MT-OSPFv3)", draft-ietf-ospf-mt-ospfv3-02.txt, Network Working Group, Mar. 2007, pp. 1-27, Cisco Systems.
Cisco Systems, Inc., "Multi-Topology Routing", Feb. 27, 2007, pp. 1-74, San Jose, CA.
Rawat, et al., "OSPF Version 2 MIB for Multi-Topology (MT) Routing", draf-rawat-ospf-mt-mib-01, Network Working Group, Sep. 27, 2006, pp. 1-36, Cisco Systems.
Cisco Systems, Inc., "Reverse Route Injection", First Published 12.1(19)E, 2005-2006, pp. 1-6, San Jose, CA.
Kent, et al., "Security Architecture for the Internet Protocol", Network Working Group, Nov. 1998, pp. 1-66.

* cited by examiner

*Primary Examiner* — Robert W Wilson
*Assistant Examiner* — Mohamed Kamara
(74) *Attorney, Agent, or Firm* — Hickman Palermo Truong & Becker LLP

(57) ABSTRACT

A method for IP Security within Multi-Topology Routing is disclosed. Disclosed methods may also include IKE extensions. A route eligible for IPSec protection is injected into a topology routing table. Network traffic can then be protected in accordance with a security session, such as an IPSec session, between a first network node and a second network node and forwarded through a selected topology to take advantage of the service-differentiation capabilities of MTR.

33 Claims, 5 Drawing Sheets

400

410
CREATE AN IPSEC SESSION BETWEEN A FIRST NODE AND A SECOND NODE IN A NETWORK HAVING A PLURALITY OF MTR TOPOLOGIES CONNECTING THE FIRST NODE AND THE SECOND NODE

420
MAP THE IPSEC SESSION INTO AT LEAST ONE OF THE MTR TOPOLOGIES

500

---

550
ASSOCIATE A PROXY-LIST WITH EACH OF THE AT LEAST ONE TOPOLOGIES

552
SIGNAL A PROXY-LIST FOR EACH TOPOLOGY IN WHICH THE IPSEC SESSION IS MAPPED, WHEREIN THE SIGNALING IS PERFORMED WITHIN A SINGLE INTERNET KEY EXCHANGE ("IKE") SESSION

554
ADVERTISE A TOPOLOGY IDENTIFIER FOR EACH ASSOCIATED PROXY-LIST

556
CONFIGURE AN ACCESS CONTROL LIST FOR EACH TOPOLOGY

---

560
CREATE A SEPARATE SECURITY ASSOCIATION ("SA") FOR EACH TOPOLOGY

562
CREATE A SEPARATE SA FOR EACH TOPOLOGY, WHEREIN EACH SA SHARES A SAME KEY

564
INCLUDE SUPPORT FOR DEAD-PEER-DETECTION IN EACH SA

---

570
PERFORM A SEPARATE IKE SESSION FOR EACH TOPOLOGY

*FIG. 5*

IP SECURITY WITHIN MULTI-TOPOLOGY ROUTING

FIELD OF THE INVENTION

The present disclosure relates generally to Multi-Topology Routing ("MTR"). Specifically, embodiments disclosed herein relate to protecting network traffic using IPSec in MTR-enabled networks.

BACKGROUND OF THE INVENTION

Computer networks have become ubiquitous. Computer networks include the Internet, Service Provider (SP) networks, private networks, and Local Area Networks (LANs), for example. Users of these networks send many different types of network traffic over these networks. The types of network traffic are sometimes referred to as classes of traffic and may include, for example, voice, video, and data. Different classes of traffic may require or impose different demands on network performance. For example, data traffic carrying email message information may not require real-time transmission across a network, whereas voice or video traffic does require real-time transmission in order to avoid traffic latency that may effect the end-use experience in viewing or listening to the voice or video transported across the network.

Multi-Topology Routing ("MTR") is a technology that network designers use when developing data networking products and services to allow processing in network devices to influence the path through a network that certain types of data traffic can take to reach a given destination in the network. MTR allows different types of traffic to take different routes in the network based on attributes of data packets such as a DiffServ Code Point ("DSCP"), application type, data type etc. MTR processing can examine the attribute of a data packet and can select a specific route for that packet within the network that best coordinates with requirements of transmission of that packet, such as real-time, delay allowed, or the like, based on certain packet attributes. MTR facilitates the creation of multiple logical topologies, which may be referred to herein as MTR topologies, within a single physical topology of the network, such that each logical topology can independently specify the path to a destination. MTR provides the capability to map the incoming traffic (i.e. packet attribute(s)) to a logical topology and offer service differentiation through class-based forwarding. MTR differs from Quality of Service ("QoS"), which provides per-hop service differentiation, in that MTR provides path-based service differentiation.

MTR involves two primary components: 1) extensions to routing protocols to signal topology-aware routing information and 2) topology-aware forwarding tables. MTR relies on marking and classifying incoming traffic to map to a topology. A topology is a subset of routers and links in an underlying network (or base topology). Thus, a topology is also characterized by an independent set of Network Layer Reachability Information ("NLRI"). A topology can overlap or share any subset of the underlying network.

MTR provides separate routing/forwarding capabilities on a per topology basis. Within a given router, an MTR topology facilitates a selection of routes upon which to forward traffic to a given destination. Each topology can route/forward a subset of the traffic as defined by a classification criteria. The specific choice of router is based on the class of the packet being forwarded and a class is determined based on an attribute of the packet itself. Thus, MTR allows packets (i.e. traffic) of different classes to be routed independently from one another. The path that a packet follows is determined by classifiers configured on the routers and interfaces in the network. The mapping of traffic to a topology is sometimes also referred to as topology selection.

Internet developers have created an Internet Protocol Security (IPSec) protocol to allow secure network-layer encryption of data traffic. IPSec is a standards-based method providing data privacy, data integrity and data authenticity and uses key management and security associations to create secure tunnels at the network layer between network devices.

BRIEF DESCRIPTION OF THE DRAWINGS

Objects, features, and advantages of inventive matter disclosed herein may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the inventive matter.

FIG. 5 illustrates additional example operations performable by a routing node and useful for creating forwarding capabilities in accordance with embodiments disclosed herein.

DESCRIPTION OF EXAMPLE EMBODIMENTS

Overview

Figure 1:
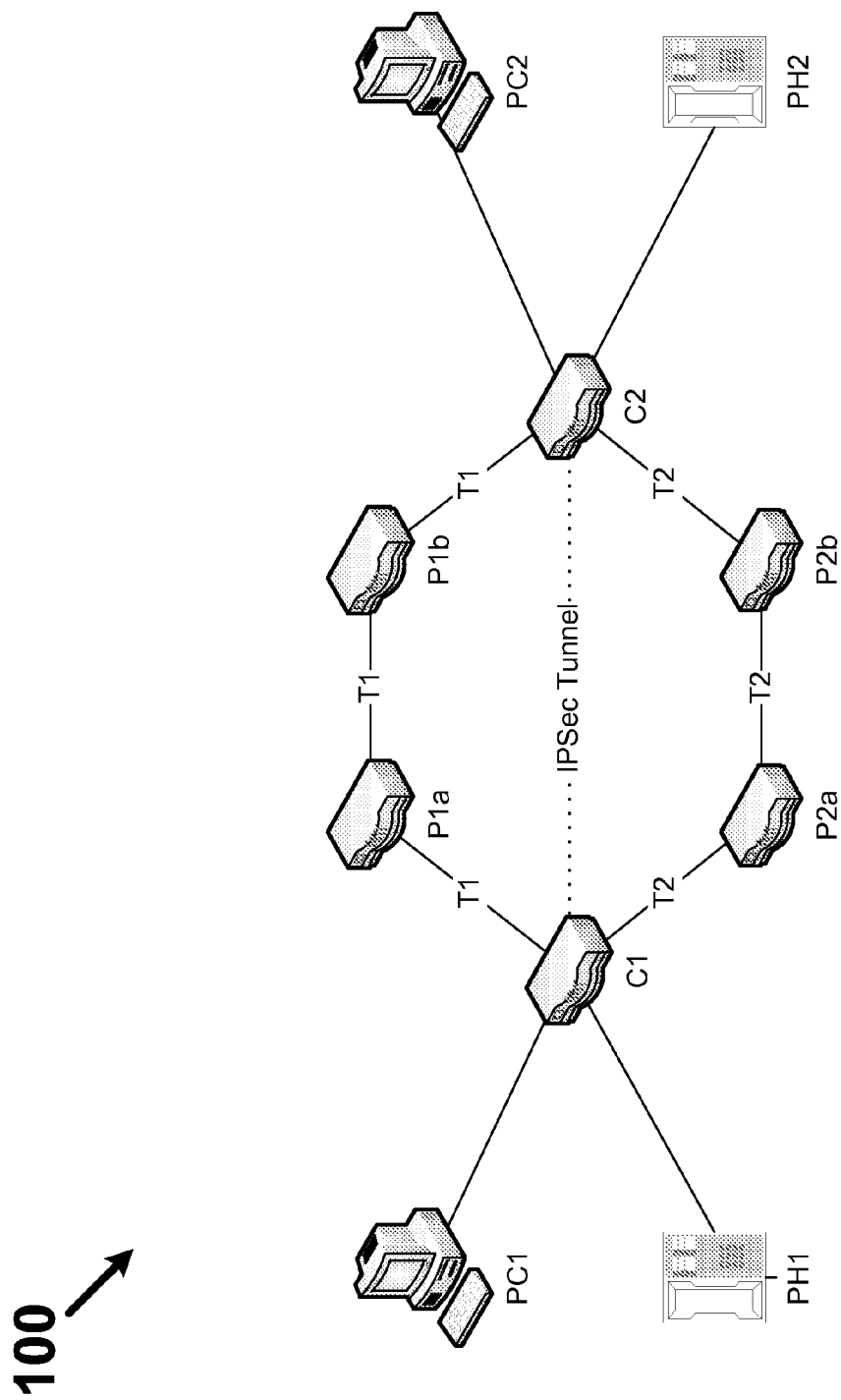
FIG. 1 illustrates an example network embodying multi-topology routing.

A benefit to MTR is that it provides "service differentiation" using more than one topology to allow path diversity for different classes or types of traffic. While MTR is popular with enterprises and service providers, in its conventional form MTR does not provide for or support topologies that are IPSec aware. In other words, MTR and IPSec do not operate together to provide topology aware IPSec. In particular, Network-based IPSec creates a logical tunnel that is used by the traffic for secure transmission of data between two end points. This tunnel creates an abstraction preventing the MTR topologies from being exposed to the traffic routed over the IPSec tunnel.

Embodiments of inventive matter disclosed herein substantially overcome such deficiencies and provide systems, methods and apparatus performable for example by a routing node such as a gateway router, that are useful in routing network traffic and that enable the use of secure transmissions such as by using IPSec within multiple logical topologies provided by MTR. In accordance with such embodiments, a routing node may configure a plurality of multi-topology routing ("MTR") topologies in a network with respective Internet Protocol ("IP") Security Protocol ("IPSec") routes. This configuration can be accomplished, for example, by using a control plane feature of IPSec called Reverse Route Injection (RRI) to "inject" routes into pre-selected (or signaled) MTR topologies on a IPSec gateway router (i.e. a first node) that maintains the injected routes over MTR to other nodes. Once the MTR tolopgies are configured in this manner, a routing node may receive network traffic of a first type at a first node in the network that is destined for a second node in the network. The routing node selects one of a plurality of secured MTR topologies based on the type of the received traffic (e.g. web data traffic using one topology, VoIP traffic another, etc.). The selected MTR topology is used for transport of the traffic in the network from the first node to the second node in a secure manner due to the injected routes. In particular, the routing node forwards the traffic from the first node to the second node in the network over the selected MTR topology using at least one of the configured (e.g. RRI injected) IPSec routes for that selected MTR topology. RRI injection has not been used in this manner within MTR networks. A second example embodiment disclosed herein provides logic, encoded in one or more tangible media (e.g. computer readable media), for execution on a computerized device (such as a router or gateway) and, when executed, is operable to perform the operations disclosed herein, such as the operations of the method described above with respect to the first example embodiment.

A third example embodiment of inventive matter disclosed herein provides an apparatus such as a router, gateway, swtich or other data communications device that operates in a network. The apparatus is enabled to perform processing operations disclosed herein, such as the operations of the method described above with respect to the first example embodiment. The apparatus comprises a processor; a memory unit that stores instructions associated with an application executable by the processor; and an interconnect coupling the processor and the memory unit, enabling the computer system to execute the application and perform operations disclosed herein.

DETAILED DESCRIPTION

FIG. 1 illustrates an example network 100 embodying multi-topology routing. The network 100 comprises a first voice-over-IP ("VOIP") device PH1 generating a first type of network traffic such as VOIP traffic having real-time requirements and a first personal computer PC1 generating a second type of network traffic such as data traffic that may not have real-time transmission requirements in the network 100. The first VOIP device PH1 and the first personal computer PC1 are communicatively connected to a first routing node C1 (labeled as 210-1) that operates in accordance with disclosed embodiments. A second VOIP device PH2 and a second personal computer PC2 are communicatively connected to a second routing node C2 (labeled as 210-2). Two separate MTR topologies T1, T2 connecting the first routing node C1 to the second routing node C2 are shown for the network 100 in FIG. 1. Routing nodes C1 (210-1) and C2 (210-2) operate MTR to establish the two topologies T1 and T2. It is to be understood that two topologies are used by way of example only, and that more than two could be configured. In this example, the first MTR topology T1 includes two routing nodes P1a, P1b, in addition to the first routing node C1 and the second routing node C2, and comprises the path C1-P1a-P1b-C2. The second MTR topology T2 includes two routing nodes P2a, P2b, in addition to the first routing node C1 and the second routing node C2, and comprises the path C1-P2a-P2b-C2. The two MTR topologies T1 and T2 can provide for different service or reliability levels such as topology T1 providing real-time traffic transfer over faster data links whereas T2 may provide a lesser quality of service for traffic transfer. FIG. 1 also illustrates IPSec routes 218-1 and 218-2 configured in accordance with embodiments described herein.

In operation of the system shown in FIG. 1, a routing process (220 in FIG. 2) operating within each node C1 and C2 (210 in FIGS. 1 and 2) configures the multi-topology routing ("MTR") topologies T1 and T2 in the network 100 with respective Internet Protocol ("IP") Security Protocol ("IPSec") routes 218-1 and 218-2. To do so, the routing processes in each node use IPSec RRI (Reverse Route Injection) in a control plane to inject the IPSec routes 218 into pre-selected (or signaled) MTR topologies T1 and T2. This injection creates IPSec routes 218 within specific MTR topology routing tables in each node C1 and C2 (as well as nodes P1a, P1b and P2a and P2b) to far Ipsec gateway's networks.

As an example, the first routing node C1 may map an IPSec route 218-1 into the MTR topologies T1 and the IPSec route 218-2 into the topology T2. Each routing node has a respective routing table (shown as 222-1 and 222-2 in FIG. 2) associated with each MTR topology T1, T2. That is, each routing node will have multiple routing tables, and each routing table is associated with a topology. Thus, the first routing node C1 in FIG. 1 will have a first routing table 222-1 (FIG. 2) for the first topology T1 and a second routing table 222-2 (FIG. 2) for the second topology T2. The routing table of each MTR topology has a corresponding route 218-1 (for table 222-1) and 218-2 (in table 222-2) to establish distinct IPSec sessions or tunnels between nodes C1 and C2.

In particular embodiments, techniques of Reverse Route Injection ("RRI") can be expanded to dynamically install the route in the routing table of the specified MTR topology. The next-hop of such route may be the IPSec tunnel available in that topology. Generally, RRI provides the ability for routes to be automatically installed in the routing table for networks and hosts that are protected by IPSec and reachable via the remote endpoint of IPSec tunnel.

In effect, the processing allows traffic in each MTR topology to be protected in accordance with an IPSec tunnel. In the forwarding plane that allows traffic transfer, the first routing node C1 (i.e., an IPSec gateway) receives network traffic from either the first personal computer PC1 or the first VOIP telephone PH1. MTR can accomplish classification of the traffic by using the DSCP value of a packet being routed as indicated in the packet header. That is, MTR functionality within the device C1 may utilize the DSCP value of a packet to assign the packet to a particular MTR topology T1 or T2. The first routing node C1 then selects one of the MTR topologies T1 or T2 based on the type of the traffic received. For example, if the first routing node C1 receives VOIP traffic from the first VOIP telephone PH1, it may select the first MTR topology T1 and if the first routing node C1 receives data traffic from the first personal computer PC1, it may select the second MTR topology T2. In this manner, individual types of network traffic (e.g., data traffic in one example, voice traffic as another) are routed to the proper MTR topology. The traffic can then be forwarded to the node C2 over the injected IPSec route 218-1 (for topology T1) or 218-2 for topology T2, depending upon which topology is selected for that traffic.

During traffic transmission from nodes PC1 or PH1, a packet will arrive on the 'inside' interface of the IPSec gateway node C1 and will follow RRI routes 218-1 or 218-2 (depending on traffic type as determined by the DSCP value in each packet) and will be redistributed into the appropriate topology. Specifically, at the IPsec gateway node C1, the packet will be classified into a specific MTR topology according to local configuration and the packet's field properties. Once mapped to a topology T1 or T2, the RRI injected route 218-1 (for T1) or 218-2 (for T2) will be used in the topology routing information database (e.g. routing table 222 in FIG. 2) to direct the packet for IPsec encapsulation. After IPsec encapsulation is done, the packet will be forwarded along the best available MTR topology (T1 in this example) based on the outer tunnel header's destination address.

More than one IPSec route 218 may be injected into routing tables for each topology. The first routing node C1 can thus protect network traffic by applying a security policy to the traffic and selecting an appropriate IPSec route (only one IPSec route 218 is shown in each topology in the example in FIG. 1). For example, the first routing node may protect the network traffic entering the IPSec tunnel 218-1 by encrypting and encapsulating the traffic. The first routing node C1 then directs the network traffic towards toward MTR topology T1 in accordance with the information in the selected MTR topology routing table using the IPSec route 218-1 for that topology and that level of security.

Figure 2:
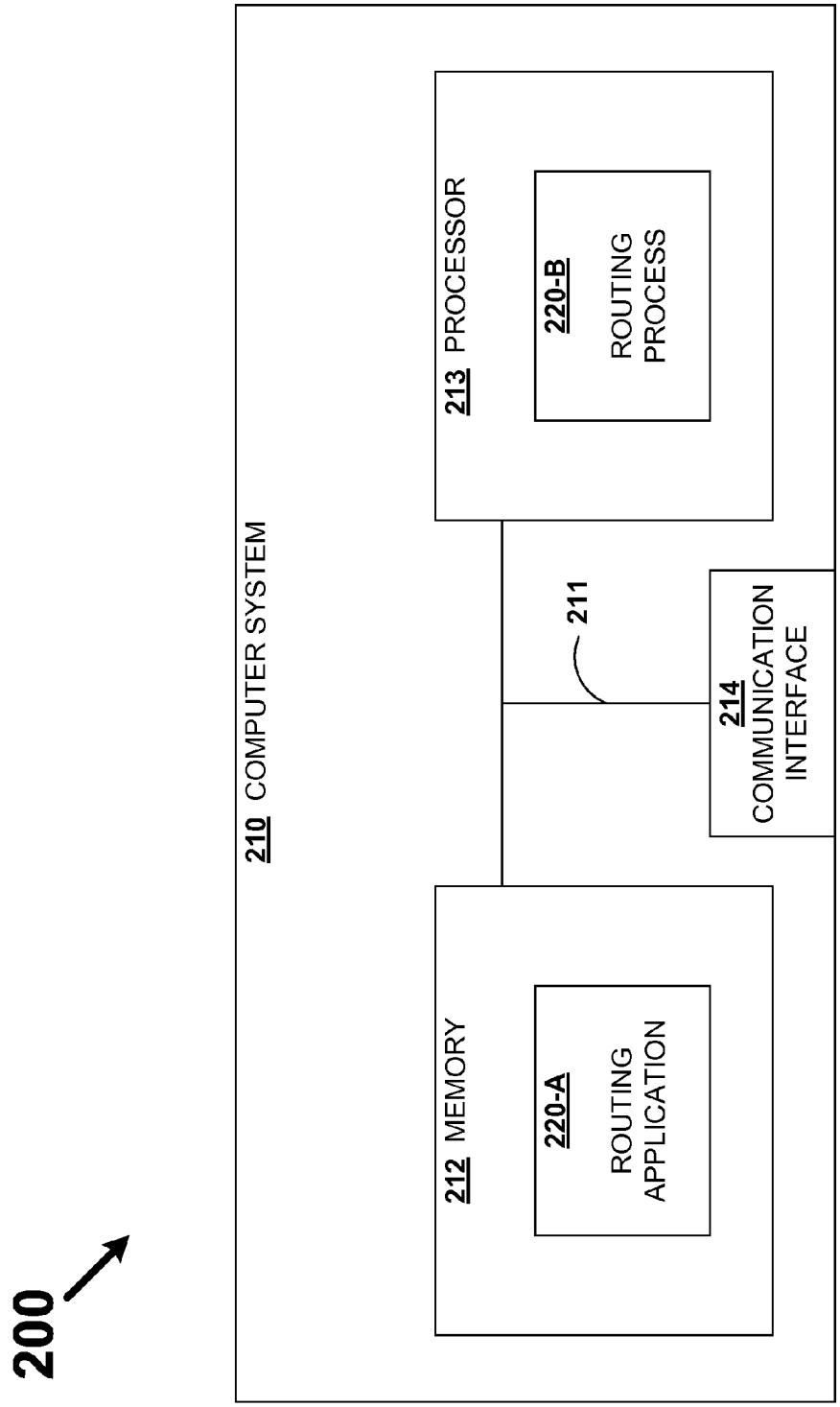
FIG. 2 illustrates an example computer system architecture for a computer system that performs operations in accordance with embodiments disclosed herein.

FIG. 2 illustrates an example computer system 210 that performs operations routing traffic using MTR and IPSec in accordance with embodiments disclosed herein. The computer system 210 may be any type of computerized system such as a router, switch, gateway, data communications device, networked computerized device, or the like. In this example, the computer system 210 includes an interconnection mechanism 211 that couples a memory system 212, a processor 213, and a communications interface 214. The communications interface 214 allows the computer system 210 to communicate with external devices or systems. The routing application and process 220 maintain respective routing tables 222-T1 and 222-T2 for the respective MTR topologies T1 and T2. Within these routing tables 222 are the respectively injected IPSec routes 218-1 (within table 222-T1) and 218-2 (within table 222-T2).

The memory system 212 may be any type of computer-readable medium that is encoded with a routing application 220-A that represents software code such as data and/or logic instructions (e.g., stored in the memory or on another computer-readable medium such as a disk) that embody the processing functionality of embodiments of the inventive matter as explained herein. The processor 213 can access the memory system 212 via the interconnection mechanism 211 in order to launch, run, execute, interpret, or otherwise perform the logic instructions of the routing application 220-A for the host in order to produce a corresponding routing process 220-B. In other words, the routing process 220-B represents one or more portions of the routing application 220-A performing within or upon the processor 213 in the computer system 210.

It is to be understood that embodiments of the inventive matter include the routing applications 220-A (i.e., the un-executed or non-performing logic instructions and/or data) encoded within a computer-readable medium such as a floppy disk, hard disk or in an optical medium, or in a memory-type system such as in firmware, read only memory (ROM), or, as in this example, as executable code within the memory system 212 (e.g., within random access memory or RAM). It is also to be understood that other embodiments of the inventive matter disclosed herein can provide the routing applications operating within the processor 213 as the routing processes. While not shown in this example, those skilled in the art will understand that the computer system 210 may include other processes and/or software and hardware components, such as an operating system, which have been left out of this illustration for ease of description of the inventive matter.

Figure 3:
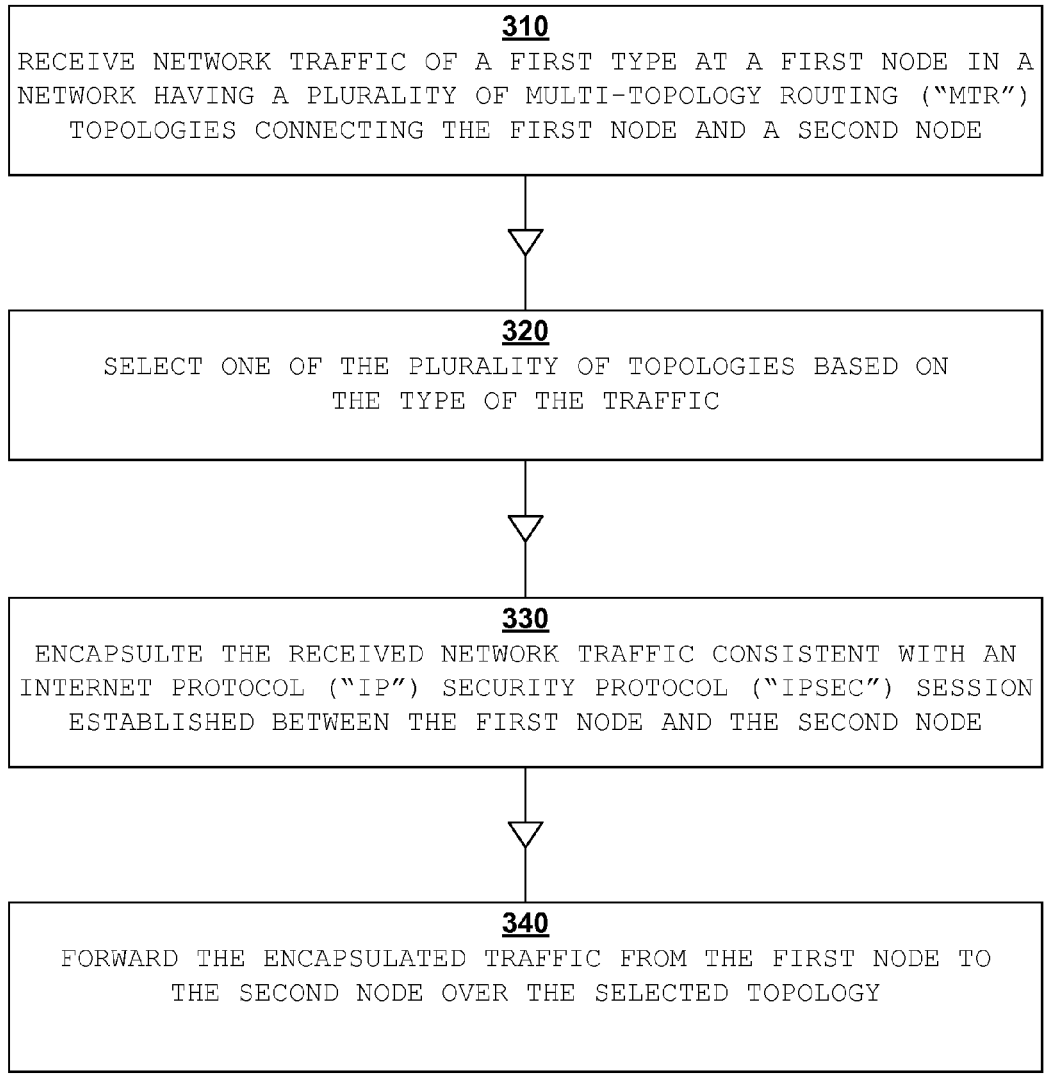
FIG. 3 illustrates example operations performable by a routing node and useful for routing traffic in accordance with embodiments disclosed herein.

FIG. 3 illustrates example operations performable by a routing node and useful for routing traffic in accordance with embodiments disclosed herein. The example operations 300 of FIG. 3 can be advantageously encoded in logic that, when executed, is operable to perform the operations 300. Such logic can be included in an apparatus that functions as a network router such as an IPSec gateway, for example. In Step 310, the computer system 210 configures a plurality of MTR topologies in a network with respective IPSec routes. As noted above, this can be done with IPSec RRI (Reverse Route Injection) to inject routes into pre-selected (or signaled) MTR topologies on the IPsec gateway routers C1 and C2.

In Step 320, the computer system 210 (e.g. node C1) receives network traffic of a first type in the network. The network traffic is destined for a second node in the network.

In Step 330, the apparatus selects one of the plurality of MTR topologies based on the type of the received traffic, the selected MTR topology to be used for transport of the traffic in the network from the first node to the second node. In Step 340, the apparatus forwards the traffic from the first node to the second node in the network over the selected MTR topology using at least one of the configured IPSec routes for that selected MTR topology. Thus, after IPSec protection is performed, a packet can be forwarded along the path of the selected MTR topology. In this manner, if the apparatus maps the received traffic to a particular MTR topology, then the post-IPSec-protection forwarding will also be in that same particular MTR topology.

FIG. 3 illustrate the operations 300 being performed in sequence. However, in other particular embodiments, the operations 300 may be performed in an alternate order. For example, in particular embodiments, the apparatus may protect the received network traffic prior to selecting one of the topologies based on the type of the traffic. Additionally, in other particular embodiments, the performance of two or more of the operations 300 may overlap. That is, the apparatus may begin performing a second operation prior to completion of a first operation.

Figure 4:
FIG. 4 illustrates example operations performable by a routing node and useful for creating forwarding capabilities in accordance with embodiments disclosed herein.

FIG. 4 illustrates example operations 400 performable by a routing node and useful for creating forwarding capabilities in accordance with embodiments disclosed herein. For example, the operations 400 may be useful in performing Step 310 shown in FIG. 3. That is, the operations 400 may be performed by a routing node to help configure a plurality of MTR topologies in a network with respective IPSec routes. The example operations 400 of FIG. 4 can be advantageously encoded in logic that, when executed, is operable to perform the operations 400. Such logic can be included in an apparatus that functions as a network router such as an IPSec gateway, for example. In particular embodiments, the apparatus performing the operations 400 of FIG. 4 will be the same apparatus performing the operations 300 of FIG. 3.

In Step 410, such an apparatus creates an IPSec session between a first node and a second node in a network having a plurality of MTR topologies connecting first node and the second node. FIG. 4 illustrates the operations 400 being performed in sequence. However, in other particular embodiments, the performance of the operations 400 may overlap.

In Step 420, the apparatus maps the IPSec session into at least one of the MTR topologies. The apparatus may perform techniques of RRI to map the IPSec session routes into the Routing Information Base ("RIB") of an IPSec gateway. It should be understood that it is not meant that alternate techniques, other than RRI, are precluded from being utilized to map the IPSec session into the RIB of an IPSec gateway.

The mapped session route can be used in the topology RIB, enabling a router to later direct packets for IPSec protection. A RIB contains information from which routes between end systems can be computed. A RIB is an abstraction in that the RIB doesn't generally exist as a single entity. Thus, the RIB can be thought of as the collective knowledge of an entire subsystem concerning the routing-relevant connectivity among the components of that subsystem. End systems and intermediate systems use routing protocols to advertise (i.e., distribute) some or all of the information stored in their locally maintained RIB.

A RIB typically comprises a table of entries that identify a destination; the next-hop to which packets should be forwarded to reach that destination (also known as the "next hop"); and some form of routing metric, which expresses one or more the characteristics for the router (e.g., its delay properties or its expected error rate) in terms that can be used to evaluate the suitability of this route, compared to another route with different properties, for conveying a particular packet or class of packets.

Routing algorithms use the information contained in the RIB to compute actual routes (i.e., "next hops"). These routes are collectively referred to as the Forwarding Information Base ("FIB"). Thus, a RIB is involved in computations that take place in the "background," independent of data traffic flowing between sources and destinations at any given moment. The FIB, on the other hand, is involved in the real-time selection of an outgoing link for every packet that arrives on an incoming link.

FIG. 5 illustrates additional example operations 500 performable in conjunction with the operations 400 of FIG. 4 by a routing node and useful for creating forwarding capabilities in accordance with embodiments disclosed herein. For example, the operations 500 may be useful in performing Step 310 shown in FIG. 3. That is, the operations 500 may be performed by a routing node to help configure a plurality of MTR topologies in a network with respective IPSec routes. The example operations 500 of FIG. 5 can be advantageously encoded in logic that, when executed, is operable to perform the operations 500. Such logic can be included in an apparatus that functions as a network router such as an IPSec gateway, for example. In particular embodiments, the apparatus performing the operations 500 of FIG. 5 will be the same apparatus performing the operations 300 of FIG. 3 and the operations 400 of FIG. 4.

In Step 550, the apparatus associates a proxy-list with each of the at least one MTR topologies. Step 550 may comprise at least one of Step 552, Step 554, and Step 556. In this embodiment, IKE may be expanded such that an IPSec gateway signals multiple proxy-lists within the same IKE session. Each proxy-list would carry a topology identifier. The information from the proxy-list may be used by Reverse Route Injection (RRI) to inject routes into the topology specific RIB. Because the specific topology per prefix is now known, a more accurate and specific topology-based RIB can be built.

In Step 552, the apparatus signals a proxy-list for each topology in which the IPSec session is mapped, wherein the signaling is performed within a single IKE session. In particular embodiments, each IPSec gateway within the same IKE session, signals multiple per-topology proxy-lists. The apparatus uses the proxy-list for each topology to describe the prefix that needs to go over the topology using information in the proxy-list. In effect, the apparatus uses the proxy-lists to create an IPSec tunnel out of each topology. The proxy-list may contain IP addresses that determine which traffic is to be protected by IPSec cryptography. That is, traffic being routed to one address may get IPSec protected, while traffic being routed to a second address may not get protected. In this manner, the proxy-list is used to define the subset of the overall traffic that is to be IPSec protected. In particular embodiments, the proxy-lists may include DSCP values. In these embodiments, the DSCP value in the proxy-list can be used as part of a selector to direct traffic to a particular MTR topology. In Step 554, the apparatus advertises a topology identifier for each associated proxy-list.

In Step 556, the apparatus configures an Access Control List ("ACL") for each topology. One way of associating the proxy-list with the topology is to configure a per-topology ACL as opposed to the conventional method of a single ACL. Additionally, more specific ACL specifications can be supported that include protocol, DSCP values, and Layer 4 port ranges. That is, Layer 4 information, such as UDP port and TCP port, may be specified in the proxy-list. These additional ACL specifications can be used to automatically create classifiers for mapping traffic to a topology on a remote IPSec gateway.

In Step 560, the apparatus creates a separate Security Association ("SA") for each topology. Step 560 may comprise at least one of Step 562 and Step 564. Implementing multi-pathing may result in packet reordering at the macro-flow level (i.e., considering the IPSec packets between two IPSec gateways). Packets arriving at an IPSec gateway could arrive out of order as they are still part of the same Security Association ("SA"). One technique for addressing this involves relaxing, or entirely disabling, any IPSec anti-replay window.

However, a technique that provides for retaining the anti-replay window involves creating per-topology SAs. Creating per-topology SAs mitigates the concern about packet reordering to a per-topology case, which is substantially the situation as a situation in which MTR was not being used.

In Step 562, the apparatus creates a separate SA for each topology, wherein each SA shares a same key. As security differentiation is not the reason for creating per-topology SAs here, there is no requirement for each different SA to have a different key. Thus, in particular embodiments, the same shared key may be used between the per-topology SAs. In other particular embodiments, different per-topology SAs may use different keys.

In Step 564, the apparatus includes support for Dead-Peer Detection ("DPD") in each SA. When using conventional technology, DPD only acts on the IKE level. However, when creating per-topology SAs as herein described, DPD messages may be triggered by each topology's SA. In particular embodiments, each SA is created such that the DPD message follows a particular topology, ensuring that reachability tests follow the actual data path.

In Step 570, the apparatus performs a separate IKE session for each topology. In particular embodiments, performing a separate IKE session for each topology may alleviate some of the same issues alleviated by the per-topology SA approach described above. Separate identities of the IKE sessions can be established in-band (during auth), or can be represented via a demux field in the IKE packets. Since MTR uses the DSCP value to map to a topology, the DSCP field may be used advantageously in particular embodiments as a demux field. In particular embodiments, this per-topology IKE approach natively allows for per-topology SAs as well as DPD, with the additional overhead of maintenance and bringing up of multiple IKEs as well as Diffe-Helman calculations.

Having described preferred embodiments of the inventive matter it will now become apparent to those of ordinary skill in the art that other embodiments incorporating these concepts may be used. Additionally, software included as part of the inventive matter may be embodied in a computer program product that includes a computer-readable medium. For example, such a computer-readable medium can include a readable memory device, such as a hard drive device, a CD-ROM, a DVD-ROM, or a computer diskette having computer-readable program code segments stored thereon. The computer-readable medium can also include a communications link, either optical, wired, or wireless, having program code segments carried thereon as digital or analog signals.

IP Cryptography within Multi-Topology Routing is herein disclosed. While inventive matter has been shown and described herein with reference to specific embodiments thereof, it should be understood by those skilled in the art that variations, alterations, changes in form and detail, and equivalents may be made or conceived of without departing from the spirit and scope of the inventive matter disclosed. Accordingly, the scope of the present invention should be assessed as that of the appended claims and by equivalents thereto.

What is claimed is:

1. A method comprising:
configuring a plurality of multi-topology routing ("MTR") topologies in a network by adding one or more respective Internet Protocol ("IP") Security Protocol ("IPSec") routes to each of the plurality of MTR topologies;
receiving network traffic of a first type at a first node in the network, the network traffic being destined for a second node in the network;
selecting an MTR topology of the plurality of MTR topologies based on the type of the received traffic, the selected MTR topology to be used for transport of the traffic in the network from the first node to the second node;
forwarding the traffic from the first node to the second node in the network over the selected MTR topology using at least one of the one or more respective IPSec routes added to that selected MTR topology;
wherein the method is performed by one or more computing devices.

2. The method of claim 1 wherein configuring the plurality of multi-topology routing ("MTR") topologies in the network by adding one or more respective Internet Protocol ("IP") Security Protocol ("IPSec") routes comprises:
injecting the one or more IPSec routes into a routing information base of at least one of the MTR topologies to create at least one secure route between the first and second node in the network.

3. The method of claim 2 wherein injecting the IPSec routes comprises:
using a reverse route injection protocol to create the at least one secure route within routing tables of the routing information base of the at least one MTR topology to establish the at least one secure route to a remote IPSec gateway in the network.

4. The method of claim 3, comprising:
associating a proxy-list with each of the at least one MTR topologies.

5. The method of claim 4, comprising:
specifying layer 4 information within the proxy-list.

6. The method of claim 4, comprising:
advertising a topology identifier for each associated proxy-list.

7. The method of claim 4, comprising:
signaling a proxy-list for each topology to which the IPSec session is mapped, wherein the signaling is performed within a single Internet Key Exchange ("IKE") session.

8. The method of claim 3, comprising:
creating a separate Security Association ("SA") for each topology.

9. The method of claim 8, comprising:
creating a separate SA for each topology, wherein each SA shares a same key.

10. The method of claim 8, comprising:
including support for Dead-Peer-Detection in each SA.

11. The method of claim 3, comprising:
performing a separate IKE session for each topology.

12. An apparatus comprising:
one or more processors;
one or more memory units storing one or more instructions executable by the one or more processors; and
one or more interconnects coupling the one or more processors and the one or more memory units;
wherein the one or more instructions stored on the one or more memory units, when executed by the one or more processors, cause:
configuring a plurality of multi-topology routing ("MTR") topologies in a network by adding one or more respective Internet Protocol ("IP") Security Protocol ("IPSec") routes to each of the plurality of MTR topologies;
receiving network traffic of a first type at a first node in the network, the network traffic being destined for a second node in the network;
selecting an MTR topology of the plurality of MTR topologies based on the type of the received traffic, the selected MTR topology to be used for transport of the traffic in the network from the first node to the second node;
forwarding the traffic from the first node to the second node in the network over the selected MTR topology using at least one of the one or more respective IPSec routes added to that selected MTR topology.

13. The apparatus of claim 12, wherein configuring the plurality of multi-topology routing ("MTR") topologies in the network by adding one or more respective Internet Protocol ("IP") Security Protocol ("IPSec") routes comprises:
injecting the one or more IPSec routes into a routing information base of at least one of the MTR topologies to create at least one secure route between the first and second node in the network.

14. The apparatus of claim 13, wherein injecting the IPSec routes comprises:
using a reverse route injection protocol to create the at least one secure route within routing tables of the routing information base of the at least one MTR topology to establish the at least one secure route to a remote IPSec gateway in the network.

15. The apparatus of claim 14, wherein the one or more instructions, when executed by the one or more processors, further cause:
associating a proxy-list with each of the at least one MTR topologies.

16. The apparatus of claim 15, wherein the one or more instructions, when executed by the one or more processors, further cause:
specifying layer 4 information within the proxy-list.

17. The apparatus of claim 15, wherein the one or more instructions, when executed by the one or more processors, further cause:
advertising a topology identifier for each associated proxy-list.

18. The apparatus of claim 15, wherein the one or more instructions, when executed by the one or more processors, further cause:
signaling a proxy-list for each topology to which the IPSec session is mapped, wherein the signaling is performed within a single Internet Key Exchange ("IKE") session.

19. The apparatus of claim 14, wherein the one or more instructions, when executed by the one or more processors, further cause:

creating a separate Security Association ("SA") for each topology.

20. The apparatus of claim 19, wherein the one or more instructions, when executed by the one or more processors, further cause:

creating a separate SA for each topology, wherein each SA shares a same key.

21. The apparatus of claim 19, wherein the one or more instructions, when executed by the one or more processors, further cause:

including support for Dead-Peer-Detection in each SA.

22. The apparatus of claim 14, wherein the one or more instructions, when executed by the one or more processors, further cause:

performing a separate IKE session for each topology.

23. One or more non-transitory computer-readable storage media storing one or more instructions, which, when executed by one or more processors, cause the one or more processors to perform:

configure a plurality of multi-topology routing ("MTR") topologies in a network by adding one or more respective Internet Protocol ("IP") Security Protocol ("IPSec") routes to each of the plurality of MTR topologies;

receive network traffic of a first type at a first node in the network, the network traffic being destined for a second node in the network;

select an MTR topology of the plurality of MTR topologies based on the type of the received traffic, the selected MTR topology to be used for transport of the traffic in the network from the first node to the second node;

forward the traffic from the first node to the second node in the network over the selected MTR topology using at least one of the one or more respective IPSec routes added to that selected MTR topology.

24. The one or more non-transitory computer-readable storage media of claim 23, wherein configuring the plurality of multi-topology routing ("MTR") topologies in the network by adding one or more respective Internet Protocol ("IP") Security Protocol ("IPSec") routes comprises:

injecting the one or more IPSec routes into a routing information base of at least one of the MTR topologies to create at least one secure route between the first and second node in the network.

25. The one or more non-transitory computer-readable storage media of claim 24, wherein injecting the IPSec routes comprises:

using a reverse route injection protocol to create the at least one secure route within routing tables of the routing information base of the at least one MTR topology to establish the at least one secure route to a remote IPSec gateway in the network.

26. The one or more non-transitory computer-readable storage media of claim 25, wherein the one or more instructions, when executed by the one or more processors, further cause:

associating a proxy-list with each of the at least one MTR topologies.

27. The one or more non-transitory computer-readable storage media of claim 26, wherein the one or more instructions, when executed by the one or more processors, further cause:

specifying layer 4 information within the proxy-list.

28. The one or more non-transitory computer-readable storage media of claim 26, wherein the one or more instructions, when executed by the one or more processors, further cause:

advertising a topology identifier for each associated proxy-list.

29. The one or more non-transitory computer-readable storage media of claim 26, wherein the one or more instructions, when executed by the one or more processors, further cause:

signaling a proxy-list for each topology to which the IPSec session is mapped, wherein the signaling is performed within a single Internet Key Exchange ("IKE") session.

30. The one or more non-transitory computer-readable storage media of claim 25, wherein the one or more instructions, when executed by the one or more processors, further cause:

creating a separate Security Association ("SA") for each topology.

31. The one or more non-transitory computer-readable storage media of claim 30, wherein the one or more instructions, when executed by the one or more processors, further cause:

creating a separate SA for each topology, wherein each SA shares a same key.

32. The one or more non-transitory computer-readable storage media of claim 30, wherein the one or more instructions, when executed by the one or more processors, further cause:

including support for Dead-Peer-Detection in each SA.

33. The one or more non-transitory computer-readable storage media of claim 30, wherein the one or more instructions, when executed by the one or more processors, further cause:

performing a separate IKE session for each topology.

* * * * *